(12) United States Patent  
Atlas et al.

(10) Patent No.: US 8,848,283 B2
(45) Date of Patent: Sep. 30, 2014

(54) OPTICAL AMPLIFICATION DEVICE AND METHOD

(75) Inventors: Dogan Atlas, Johns Creek, GA (US); Mohammad Mahbobzadeh, Suwanee, GA (US)

(73) Assignee: ADVA Optical Networking SE (DE)

( * ) Notice: Subject to any disclaimer, the term of this patent is extended or adjusted under 35 U.S.C. 154(b) by 539 days.

(21) Appl. No.: 12/909,146

(22) Filed: Oct. 21, 2010

(65) Prior Publication Data

US 2012/0099186 A1    Apr. 26, 2012

(51) Int. Cl.
| | | |
|---|---|---|
| H04B 10/17 | (2006.01) | |
| H04B 10/293 | (2013.01) | |
| H01S 3/067 | (2006.01) | |
| H04B 10/12 | (2006.01) | |
| H01S 3/13 | (2006.01) | |
| H01S 3/10 | (2006.01) | |

(52) U.S. Cl.
CPC ............ *H01S 3/1301* (2013.01); *H01S 3/1305* (2013.01); *H04B 10/2931* (2013.01); *H01S 3/10015* (2013.01); *H01S 2301/02* (2013.01); *H01S 3/06754* (2013.01)
USPC ...................................... 359/337; 359/341.41

(58) Field of Classification Search
USPC ............................................. 359/337, 341.41
See application file for complete search history.

(56) References Cited

U.S. PATENT DOCUMENTS

| | | | | |
|---|---|---|---|---|
| 5,506,724 | A | * | 4/1996 | Shimizu et al. .......... 359/341.41 |
| 5,598,491 | A | | 1/1997 | Ohya et al. |
| 6,008,932 | A | * | 12/1999 | Luo et al. ....................... 359/337 |
| 6,175,436 | B1 | * | 1/2001 | Jackel ........................... 359/349 |
| 6,347,008 | B1 | * | 2/2002 | Vodhanel .................... 359/337.4 |
| 6,501,594 | B1 | | 12/2002 | Hwang et al. |
| 6,950,232 | B1 | | 9/2005 | Yam |
| 7,405,870 | B2 | * | 7/2008 | Qiao et al. ................ 359/341.41 |
| 7,417,792 | B2 | * | 8/2008 | Hatae et al. .............. 359/341.43 |
| 2002/0135867 | A1 | * | 9/2002 | Jackel ........................... 359/337 |
| 2003/0133713 | A1 | | 7/2003 | Ng et al. |
| 2004/0051938 | A1 | * | 3/2004 | Chan et al. .................. 359/337.1 |
| 2006/0146398 | A1 | | 7/2006 | Aozasa et al. |
| 2007/0133084 | A1 | * | 6/2007 | Choi et al. ................ 359/341.41 |
| 2007/0264014 | A1 | | 11/2007 | McClean et al. |

FOREIGN PATENT DOCUMENTS

JP    20010223419 A    8/2001

* cited by examiner

*Primary Examiner* — Eric Bolda
(74) *Attorney, Agent, or Firm* — Donald R. Boys; Central Coast Patent Agency, Inc.

(57) ABSTRACT

It is described an optical amplification device for receiving an optical input signal and transmitting an amplified optical output signal on the basis of the optical input signal comprising an optical amplifier that comprises an input and an output. An optical gain control unit is connected to the output path of the optical amplifier and the optical gain control unit is connected to the input path of the optical amplifier. The optical gain control unit is configured to control the gain of the optical output signal. Additionally, an electrical gain control unit is connected to the output path of the optical amplifier. The electrical gain control unit is also connected to the input path of the optical amplifier. The electrical gain control unit is configured to control the gain of the optical output signal.

By providing both an electrical gain control unit and an optical gain control unit, a control characteristic can be improved.

7 Claims, 3 Drawing Sheets

US 8,848,283 B2

OPTICAL AMPLIFICATION DEVICE AND METHOD

FIELD OF THE INVENTION

The invention relates to gain control of optical amplifiers.

BACKGROUND

Optical signals in optical networks are affected by attenuation and therefore have to be amplified to reach longer distances. An amplifier for this purpose receives optical signals to further transmit the optical signals in an amplified form.

The principle of automatic gain control (AGC) is to provide an ideally constant channel power of an optical output signal.

SUMMARY

It is described an optical amplification device for receiving an optical input signal and transmitting an amplified output signal on the basis of the optical input signal comprising an optical amplifier comprising an input and an output. An optical gain control unit is connected to the output path of the optical amplifier and the optical gain control unit is connected to the input path of the optical amplifier. The optical gain control unit is configured to control the gain of the optical output signal. An electrical gain control unit is connected to the output path of the optical amplifier. The electrical gain control unit is connected to the input path of the optical amplifier. The electrical gain control unit is configured to control the gain of the optical output signal.

Furthermore a method for receiving an optical input signal and transmitting an amplified output signal on the basis of the optical input signal with an optical amplifier to control the amplification is described. The method comprises the controlling of the amplification by means of the optical gain control unit and the controlling of the amplification by means of the electrical gain control unit.

Advantageously, the optical amplification device and the method according to the embodiments achieve an improved gain control characteristic as compared to conventional systems that either rely on a single optical gain control or a single electrical gain control mechanism.

Particularly, even sudden substantial changes of an optical input power to the optical amplifier, which may e.g. result from adding or removing WDM (wavelength division multiplexing) channels from the input signal to the optical amplifier, only result in comparatively small output power transients on the remaining (surviving) WDM channels thus enabling to maintain the output signal's channel powers on nearly the same power level as compared to a stationary operation. Therefore, the signal quality of the optical output signal is improved. A propagation of error signals in devices downstream of the optical amplifier device according to the embodiments is therefore advantageously decreased.

A further embodiment describes an optical amplification device with the optical gain control unit further comprising an attenuation device. The attenuation device is connected to the output path of the optical amplifier and the attenuation device is connected to the input path of the optical amplifier.

The attenuation device inter alia adjusts the power level of the optical control signal. The control signal is a filtered portion of the output signal spectrum which is circulated (in either the forward or backward direction of the signal flow) and amplified by the optical amplification device.

A further embodiment describes the optical amplification device with the optical gain control unit further comprising an optical add/drop filter which is connected to the output path of the optical amplifier. The attenuation device is connected to the optical add/drop filter. A further optical add/drop filter is connected to the attenuation device and to the input path of the optical amplifier.

A further embodiment describes the optical amplification device with the electrical gain control unit further connected to the optical amplifier. The electrical gain control unit is configured to control the operating parameters of the optical amplifier by means of a control signal.

Therefore the electrical gain control unit can perform an electrical gain control of the optical amplifier to maintain a same level of optical output power even in case of optical input power fluctuations, e.g. if WDM channels are added or dropped to/from the optical input signal.

A further embodiment describes the optical amplification device with the electrical gain control unit further comprising a converter device attached to the input path and/or the output path of the optical amplifier. The converter device is configured to convert optical signals into electrical signals.

A further embodiment describes the optical amplification device with the electrical gain control unit configured to incorporate a target gain for the optical amplifier.

A further embodiment describes the optical amplification device with the electrical gain control unit configured to incorporate an ASE correction signal (ASE stands for amplified spontaneous emission, which is a source of noise in optical fiber amplifiers) thus providing for a more precise electrical gain control.

A further embodiment of the method according to the present invention comprises attenuating a signal portion from the output path of the optical amplifier.

A further embodiment of the method comprises injecting the attenuated signal portion in the input path of the optical amplifier.

A further embodiment of the method comprises monitoring the input path and/or the output path of the optical amplifier.

A further embodiment of the method comprises generating of a control signal for controlling the gain of the optical amplifier.

BRIEF DESCRIPTION OF THE FIGURES

Further features, aspects and advantages of the present invention are given in the following detailed description with reference to the drawings in which:

FIG. 3b schematically illustrates an exemplary behaviour of the third optical amplification device depicted by FIG. 3a.

DESCRIPTION OF THE EMBODIMENTS

Figure 1A:
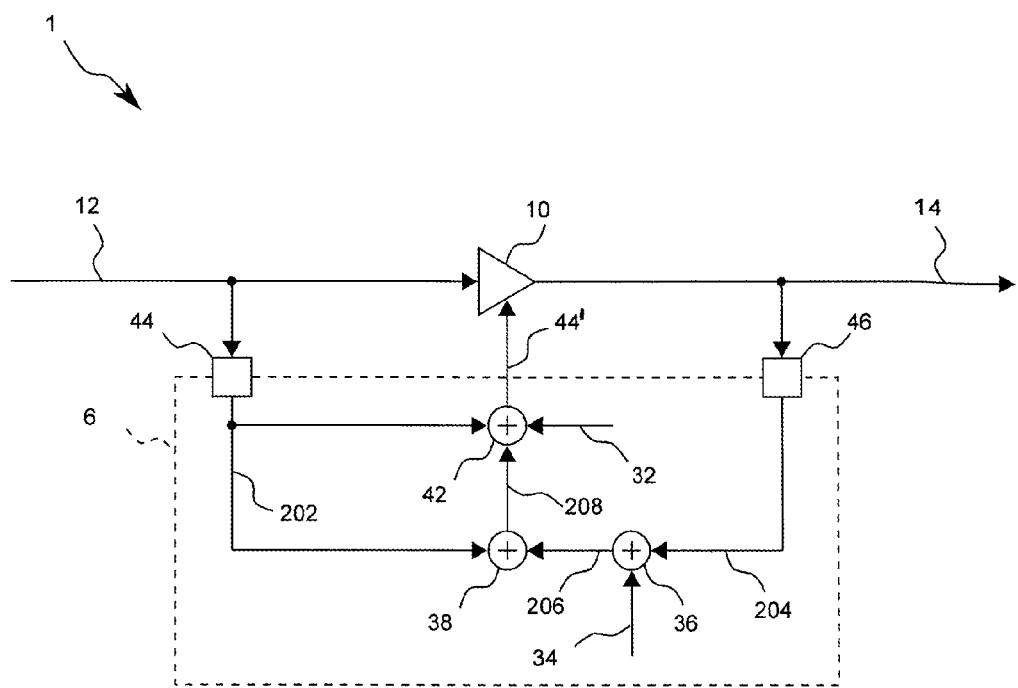
FIG. 1a shows a schematic block diagram of a first optical amplification device.

FIG. 1a shows a schematic block diagram of a first optical amplification device 1. An optical input signal 12 is applied to an optical amplifier 10. The optical input signal 12 is considered the input path of the optical amplifier 10. The optical amplifier 10 may e.g. comprise an Erbium doped fiber amplifier, EDFA. The optical amplifier 10 amplifies the optical input signal 12 and transmits a corresponding amplified optical signal 14 and ASE noise. The optical output signal 14 is considered the output path of the optical amplifier 10.

The optical amplifier 10 is controlled by a control signal 44'. The control signal 44' is generated by an electrical gain control unit 6, which is also termed as automatic gain control, AGC. The optical input signal 12 and the optical output signal 14 are applied to the electrical gain control unit 6. The optical input signal 12 is applied to a converter device 44 to convert the optical input signal 12 to an electrical signal 202. The optical output signal 14 is applied to a converter device 46 to convert the optical output signal 14 to an electrical signal 204.

The electrical signal 204 is applied to a unit 36, which may e.g. perform an addition or subtraction of input signals 34, 204. More generally, the unit 36 may also perform any other kind of mathematical operation depending on its input signals 34, 204.

An ASE correction signal 34 is also applied to the unit 36. ASE stands for amplified spontaneous emission, which is a source of noise in optical fiber amplifiers. Therefore the ASE correction signal is considered a disturbance variable incorporating the power of the amplified spontaneous emission. The unit 36 links the ASE correction signal 34 and the electrical signal 204, whereby an electrical signal 206 is obtained. The electrical signal 206 is applied to a further unit 38.

The electrical signal 202 is also applied to the unit 38. The unit 38 links the electrical signal 202 and the electrical signal 206, preferably by means of a mathematical operation such as an addition, whereby an electrical signal 208 is obtained. The electrical signal 208 is applied to a further unit 42. The electrical signal 202 is also applied to the unit 42. A target gain 32, which represents a desired optical gain to be applied to said input signal 12 by said amplifier 10, is also applied to the unit 42. The unit 42 links the electrical signal 202, the electrical signal 208, and the target gain 32 to obtain the control signal 44'.

As mentioned above, according to a preferred embodiment, the units 36, 38, and 42 usually link up the applied signals by addition, subtraction or any other kind of mathematical operation.

The electrical gain control unit 6 according to FIG. 1a controls the optical amplifier 10 by means of the control signal 44' which is generated depending on the optical input signal 12 and the optical output signal 14 as explained above.

Figure 1B:
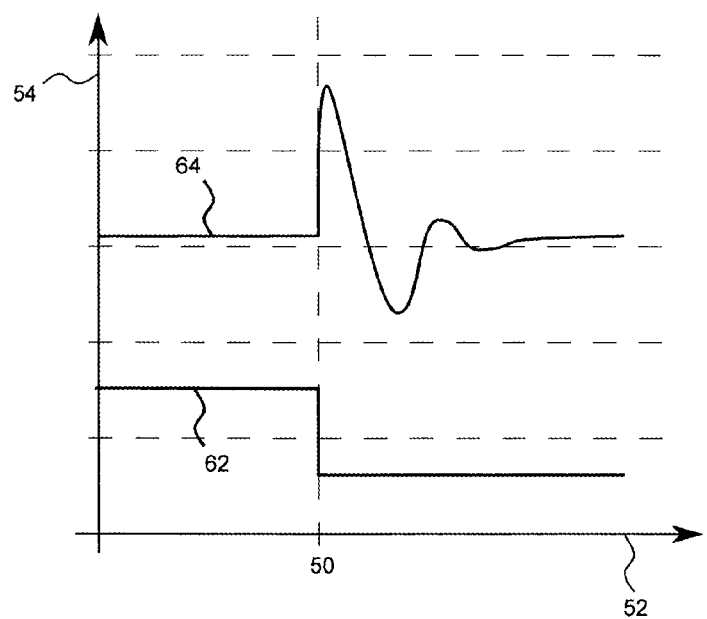
FIG. 1b schematically illustrates an exemplary behaviour of the first optical amplification device.

FIG. 1b schematically illustrates an exemplary operational behaviour of the first optical amplification device 1 depicted by FIG. 1a in a diagram. The diagram comprises a time axis 52 and a power axis 54. A point in time 50 marks the decay in the input signal power 62. Up to the point in time 50, the sum of all input signal powers remains on a constant first level, and after the point in time 50 the input signal power 62 assumes a lower second level. The input signal power 62 corresponds to the optical input signal 12 in FIG. 1a. A channel can also be referred to as a certain wavelength, and the sudden decrease in optical input power reflected by input signal power 62 at the time 50 may result from one or more WDM channels having been removed from said optical input signal 12.

The output channel power signal 64 is a component of the remaining WDM channels at the optical output signal 14 in FIG. 1a. Up to the point in time 50, the output signal channel power 64 remains on a nearly constant level. The power decay in the input signal power 62 is monitored by the electrical gain control unit 6 by monitoring the optical input signal 12 and the optical output signal 14 as explained above with reference to FIG. 1a. The optical amplifier 10 is correspondingly controlled through the control signal 44' to maintain the level of the output channel power signal 64 as before the point in time 50. As a result of the power decay in the input signal power 62, the output channel power signal 64 comprises a transient oscillation of substantial amplitude after the point in time 50. Such oscillation is also referred to as "overshoot" or "undershoot", respectively, and is highly undesired since it affects transmission quality. The shape and amplitude of said oscillation depends on the structure of electrical gain control unit 6 and its provisioning of the control signal 44'.

Figure 2A:
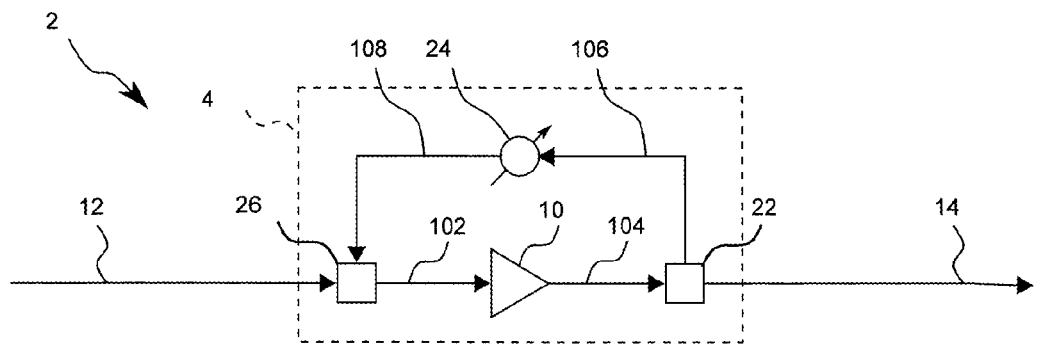
FIG. 2a shows a schematic block diagram of a second optical amplification device.

FIG. 2a shows a schematic block diagram of a second optical amplification device 2. The optical input signal 12 is applied to an optical add/drop filter 26. The optical add/drop filter 26 transmits an optical signal 102 to the optical amplifier 10. The optical input signal 12 and the optical signal 102 are considered the input path of the optical amplifier 10. The optical amplifier 10 amplifies the optical input signal 12 and transmits a corresponding optical output signal to another optical add/drop filter 22. The WDM add/drop filter 22 transmits the optical output signal 14.

The optical add/drop filter 26 and the optical add/drop filter 22 are part of an optical gain control unit 4. The optical add/drop filter 22 extracts a certain spectral portion of signal 104, preferably the ASE noise only, and forwards this portion in form of an optical control signal 106 to establish an optical feedback loop. The optical signal 104 and the optical output signal 14 are considered the output path of the optical amplifier 10.

The optical feedback loop also comprises an attenuation device 24 to which the control signal 106 is applied. The attenuation device 24 attenuates the control signal 106 by a predetermined amount. Therefore, the optical signal 108 obtained at an output of device 24 is considered an attenuated signal, which is fed back to the optical input path of amplifier 10 to establish an optical amplification feedback loop.

The attenuation device 24 inter alia adjusts the power level of the optical control signal 106. The control signal 106 is a filtered portion of the spectrum of the output signal 14 which is circulated (in either the forward or backward direction of the signal flow) and amplified by the optical amplification device 10.

Figure 2B:
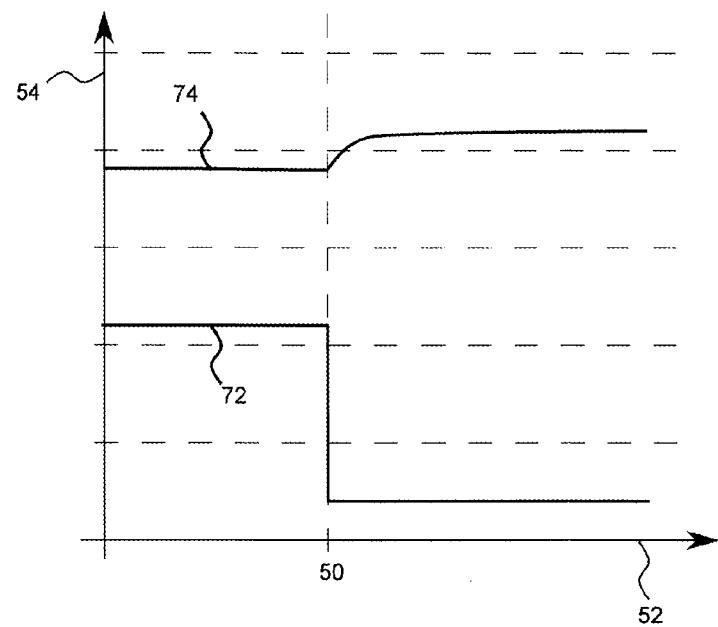
FIG. 2b schematically illustrates an exemplary behaviour of the second optical amplification device.

FIG. 2b schematically illustrates an exemplary behaviour of the second optical amplification device 2 in a diagram. The diagram comprises the time axis 52 and the power axis 54. The point in time 50 marks the decay in the input signal power 72, and is similar to input signal power 62 as already explained above. Up to the point in time 50 the input signal power 72 remains on a constant level, and after the point in time 50 the input signal power 72 assumes a lower level.

Output signal power 74 reflects the transient response of the optical gain control unit 4 as depicted by FIG. 2a. The decay in the input signal power 72 results in a steady-state gain, channel power, and offset of the output signals, e.g. the output signal power 74. The output channel powers and hence the gain does not remain at the same level as before the input power decay.

Figure 3A:
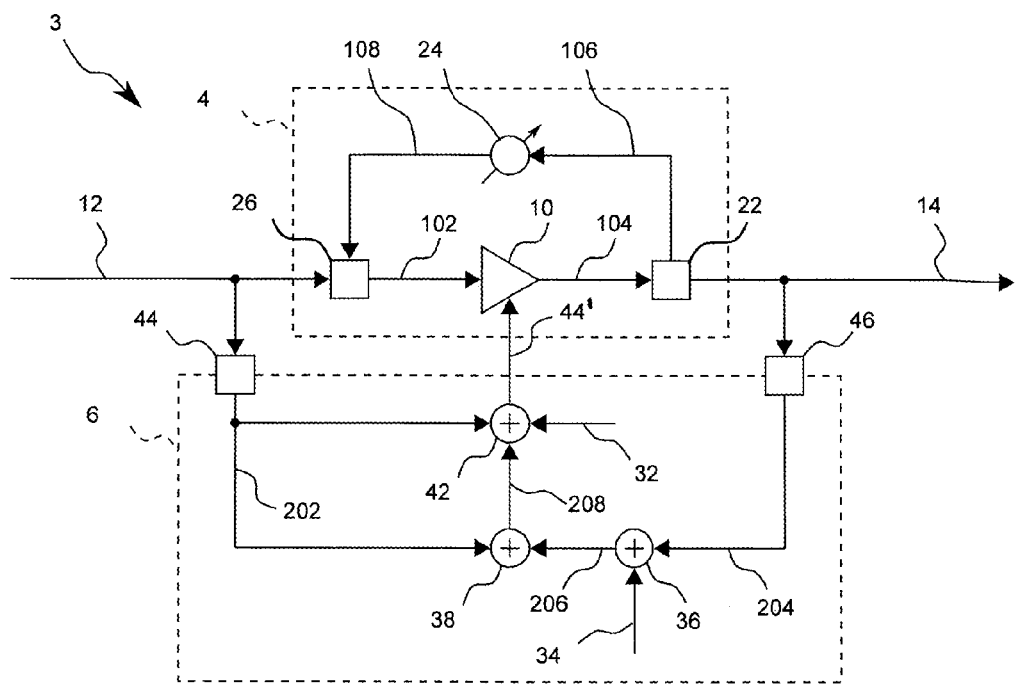
FIG. 3a shows a schematic block diagram of a preferred embodiment of an optical amplification device.

FIG. 3a shows a schematic block diagram of a third optical amplification device 3 according to a particularly preferred embodiment. The device 3 advantageously comprises both an electrical gain control unit 6 as explained with reference to FIG. 1a and an optical gain control unit 4 as explained with reference to FIG. 2a.

The optical input signal 12 is applied to the converter device 44 of the electrical gain control unit 6. The optical input signal 12 is also applied to the optical add/drop filter 26 of the optical gain control unit 4. The optical add/drop filter 26 outputs the optical signal 102, which is applied to the optical amplifier 10. The control signal 44' of the electrical gain unit 6 is also applied to the optical amplifier 10 to electrically control its optical gain as already explained above.

The optical amplifier 10 outputs the optically amplified signal 104. The optical signal 104 is applied to the optical add/drop filter 22. The optical add/drop filter 22 generates the optical output signal 14. The optical output signal 14 is applied to the converter device 46 of the electrical gain control unit 6 as already explained above.

The internal structure of the gain control units 4, 6 basically corresponds with the embodiments already explained above with reference to FIGS. 1a, 2a. However, minor adaptations may be required to optimize the gain control units 4, 6 for simultaneously influencing the optical gain of amplifier 10. E.g., according to an embodiment, the attenuation of device 24 may be controlled depending on the target gain 32 supplied to the electrical gain control unit 6 and vice versa.

Figure 3B:
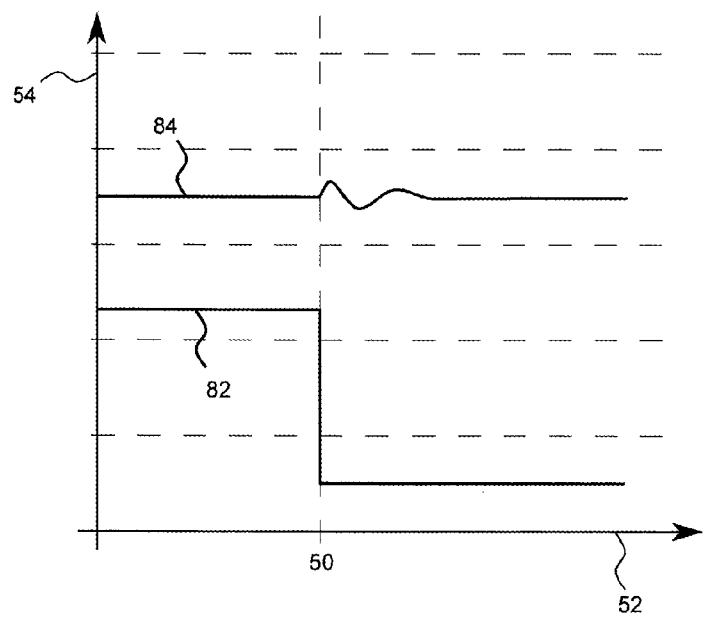

FIG. 3b schematically illustrates an exemplary behaviour of the third optical amplification device 3 in a diagram. The diagram comprises the time axis 52 and the power axis 54. The point in time 50 marks the decay in the input signal power 82. Up to the point in time 50 the input signal power 82 remains on a substantially constant level, and after the point in time 50 the input signal power 82 assumes a lower level. The higher level of the input signal power 82 e.g. reflects an optical power of multiple WDM channels and the lower level reflects an optical power of a single remaining WDM channel of said input signal 12.

Correspondingly, the output signal power 84 is part of the optical output signal 14 of FIG. 3a. Up to the point in time 50, the output signal power 84 remains on a nearly constant level. However, the power decay in the input signal power 82 expectedly results in a transient response of the output signal power 84.

As can be seen from FIG. 3b, the combined structure of the optical gain control unit 4 and the electrical gain control unit 6 (FIG. 3a) has the advantageous effect that a transient response oscillation and a steady-state level offset of the output signal power 84 is considerably reduced as compared to the systems of FIG. 1a, 2a.

I.e., in comparison with the diagram of FIG. 1b, the oscillation amplitude of the output signal power 84 is smaller than the oscillation amplitude of the output signal power 64. In comparison with the diagram of FIG. 2b, the level of the output signal power 84 advantageously returns to its previous level after the point in time 50.

For the case that the input signal power 82 features a rise instead of the decay the optical amplification device also reduces an oscillation and maintains the output signal power 84 on nearly the same level.

Thus, a combination of both gain control principles (electrical and optical) by means of the gain control units 6, 4 as depicted by the embodiment according to FIG. 3a advantageously reduces transient errors of an amplified optical output signal.

The invention claimed is:

1. Optical amplification device for receiving an optical input signal and transmitting an amplified optical output signal on the basis of the optical input signal comprising:
   an optical amplifier comprising an input and an output;
   an optical gain control unit connected to the output path of the optical amplifier and the optical gain control unit connected to the input path of the optical amplifier, the optical gain control unit configured to control the gain of the optical output signal; and
   an electrical gain control unit connected to the output path of the optical amplifier and the electrical gain control unit connected to the input path of the optical amplifier, the electrical gain control unit configured to control the gain of the optical output signal;
   wherein the electrical gain control unit is further connected to said output path of the optical amplifier by means of an optical add/drop filter and is configured to control the operating parameters of the optical amplifier by means of a control signal, wherein the electrical gain control unit is configured to incorporate a target gain for the optical amplifier, wherein the optical gain control unit comprises an attenuation device connected to the output path of the optical amplifier and the attenuation device is connected to the input path of the optical amplifier, and wherein the attenuation device is controlled depending on the target gain supplied to the electrical gain control unit.

2. Optical amplification device according to claim 1, the optical gain control unit further comprising an optical add/drop filter connected to the output path of the optical amplifier;
   the attenuation device connected to the optical add/drop filter; and an optical add/drop filter connected to the attenuation device and the optical add/drop filter (26) connected to the input path of the optical amplifier.

3. Optical amplification device according to claim 1, the gain control unit (6) further comprising a converter device attached to the input path and/or the output path of the optical amplifier, the converter device configured to convert optical signals into electrical signals.

4. Optical amplification device according to claim 1, the electrical gain control unit configured to incorporate an ASE correction signal which stands for the power of amplified spontaneous emission.

5. Method for receiving an optical input signal and transmitting an amplified optical output signal on the basis of the optical input signal with an optical amplifier providing optical amplification of said optical input signal, said method comprising:
   (a) controlling of the amplification by means of an optical gain control unit connected to said input path of the optical amplifier by means of an optical add/drop filter, and wherein said optical gain control unit is connected to said output path of the optical amplifier by means of an optical add/drop filter; and
   (b) controlling of the amplification by means of an electrical gain control unit by generating a control signal for the optical amplifier depending on a target gain, and attenuating a signal portion from the output path of the optical amplifier.

6. Method according to claim 5, the controlling of the amplification by means of the optical gain control unit further comprising:
   injecting the attenuated signal portion in the input path of the optical amplifier.

7. Method according to claim 5, the controlling of the amplification by means of the electrical gain control unit further comprising:
   monitoring the input path and/or the output path of the optical amplifier.

* * * * *